UNITED STATES PATENT OFFICE.

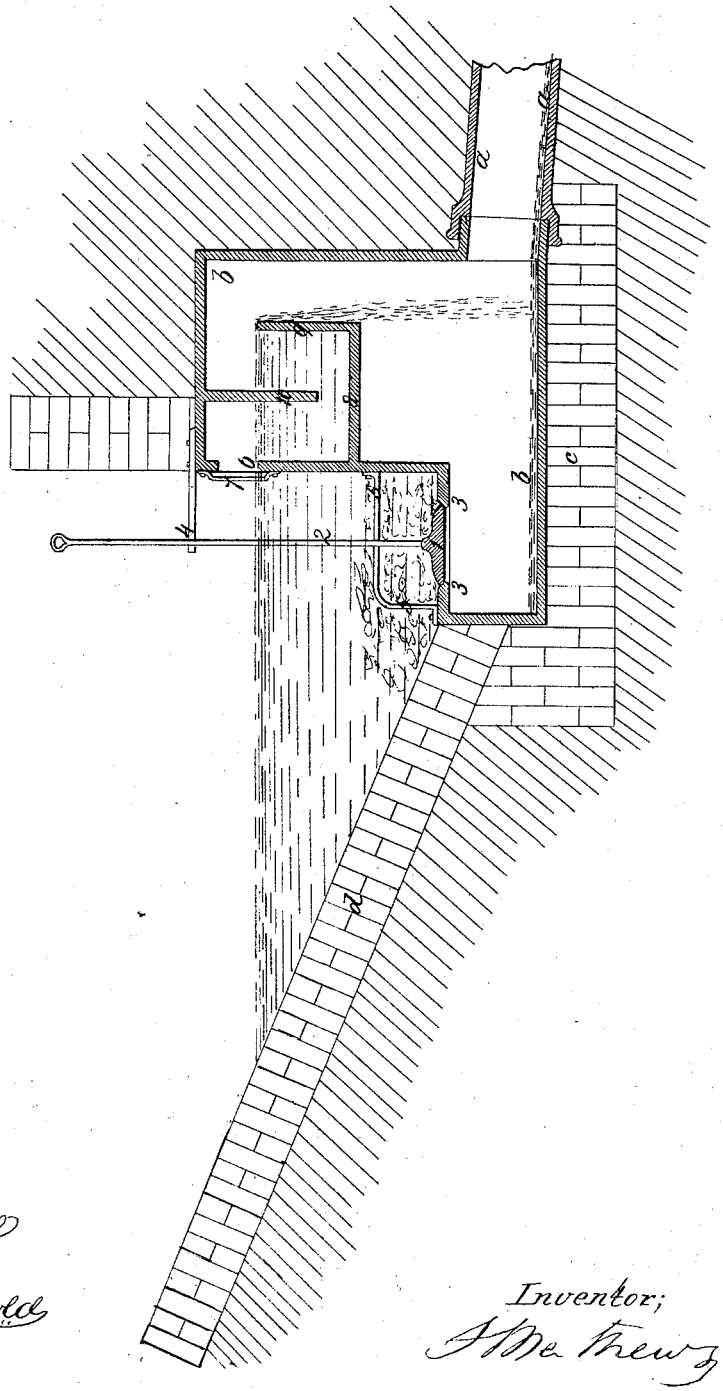
S. Mathews.
Sewer Trap.
N° 21,011.  Patented Jul. 27, 1858.
Witnesses:
Lemuel W. Serrell
Thomas G. Harold
Inventor:
S. Mathews

SAML. MATHEWS, OF NEW YORK, N. Y.

FLUSHING-VALVE TRAP FOR SINKS, SEWERS, &c.

Specification of Letters Patent No. 21,011, dated July 27, 1858.

*To all whom it may concern:*

Be it known that I, SAMUEL MATHEWS, of the city, county, and State of New York, have invented, made, and applied to use a certain new and useful Improvement in Traps for Sinks, &c.; and I do hereby declare that the following is a full, clear, and exact description of the construction and operation of the same, reference being had to the annexed drawing, making part of this specification, in which a vertical section of my said apparatus is shown as in use.

In cities supplied with water and provided with sewers the water closets, privies in the yard, sinks for dirty water, and drainage from the yards as well as the rain water is generally passed by one main pipe, at a slight inclination, into the street sewer, and in consequence of the slow passage of the water said pipes often become clogged with sediment involving considerable cost to repair, and subjecting the occupants to great inconvenience.

The nature of my said invention consists in a peculiarly constructed trap, located at the highest end of the inclined pipe leading to the sewer, immediately below the privies or at the point where the pipes from water closets sinks or leaders from the house are discharged.

The peculiarity of this trap consists in the use of a valve in connection with an overflow culvert in such a manner that all solid matter is retained together with a body of water, so that when said valve is raised the rush of water carries off the said solid matter directly into the sewer without permitting the same to deposit in the inclined pipe; and when said valve is closed the surplus overflow water is taken through a culvert in said trap which effectually prevents smell from escaping from said trap, and said trap also excludes rats from the sewer, preventing their depredations and injury to the buildings privies water closets &c.

In the drawing $a$, is the inclined pipe of suitable size leading to the sewer in the street.

$b$, is the trap formed of cast iron or other suitable material.

$c$, is the brick or masonwork in which the trap is set, and $d$, is the inclined basin or hopper into which the water closets sinks &c. empty, or which forms the privy vaults.

1, is a valve of suitable size on the end of the rod 2, and setting on the seat 3.

4 is a guide or guides to the valve rod 4.

5, is a grating to prevent solid substances such as bottles &c. that may have been thrown into the sink passing to the valve 1.

6, is an opening in the side of the trap $b$, with a grating 7, in front thereof. 8, is a division in said trap and 9 an overflow or dam.

10, is a division between 6 and 9, passing into the water retained by said dam 9 so as to exclude rats smell &c.

It will now be apparent that all solid matter settles down into the lower part of the basin $d$ near the valve 1, and a body of water is retained above the same as shown while surplus overflow water passes away through the opening 6. Every week, month, or as often as necessary the valve 1, is to be lifted and the body of water in the basin washes out all the soil &c. before it, any articles retained by the grating 5, are removed, and the sink can be washed out by a few pails of water, and the valve 1, again replaced on its seat. By this means the costly and inconvenient repairs heretofore necessary are avoided and the clogging of the pipe ($a$) effectually prevented.

This trap should be at sufficient depth in the earth to avoid frost.

I do not claim a culvert in itself or valve for water closets, but

What I claim as my invention and desire to secure by Letters Patent is—

The combination of the basin $d$, and valve 1, with the overflow culvert (8, 9, 10,) in the trap $b$, substantially as and for the purposes specified.

In witness whereof I have hereunto set my signature this twentieth day of February, 1858.

S. MATHEWS.

Witnesses:
LEMUEL W. SERRELL,
THOMAS G. HAROLD.